Sept. 5, 1944.  H. R. MOULTON  2,357,345
LENS AND PROCESS FOR MAKING SAME
Filed Dec. 2, 1939  2 Sheets-Sheet 1
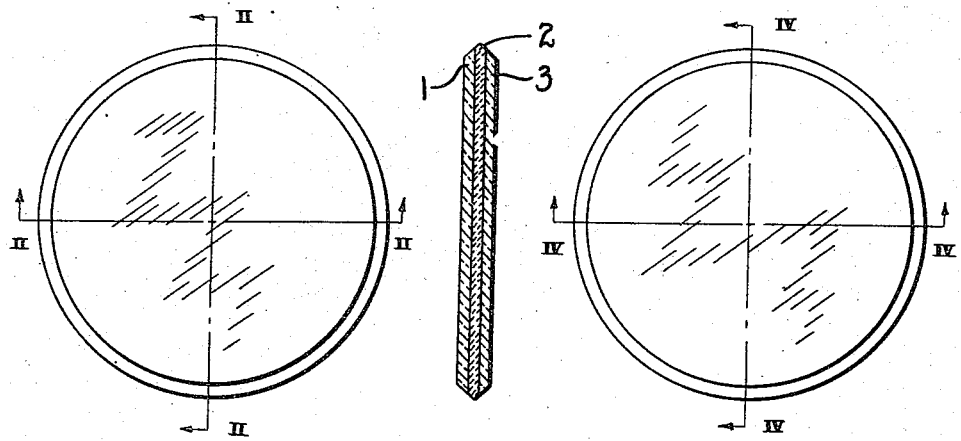
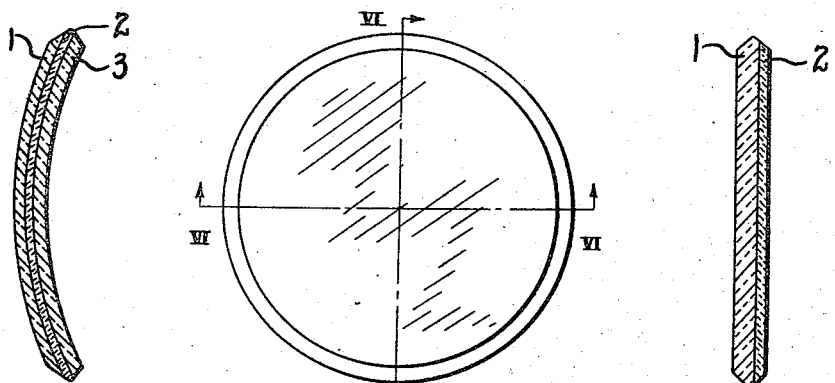
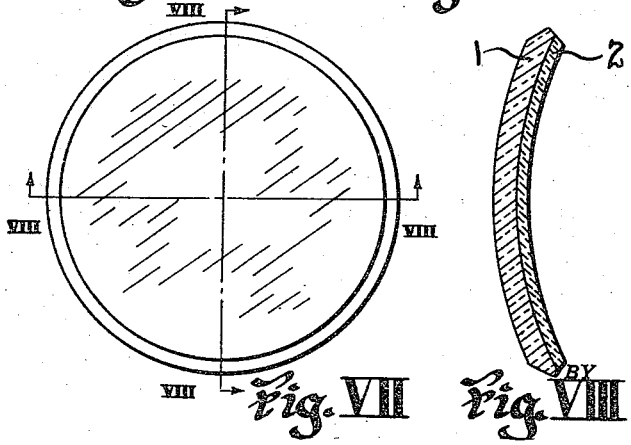
INVENTOR.
HAROLD R. MOULTON
BY Harry H. Styll.
ATTORNEY.

Sept. 5, 1944.  H. R. MOULTON  2,357,345
LENS AND PROCESS FOR MAKING SAME
Filed Dec. 2, 1939  2 Sheets-Sheet 2
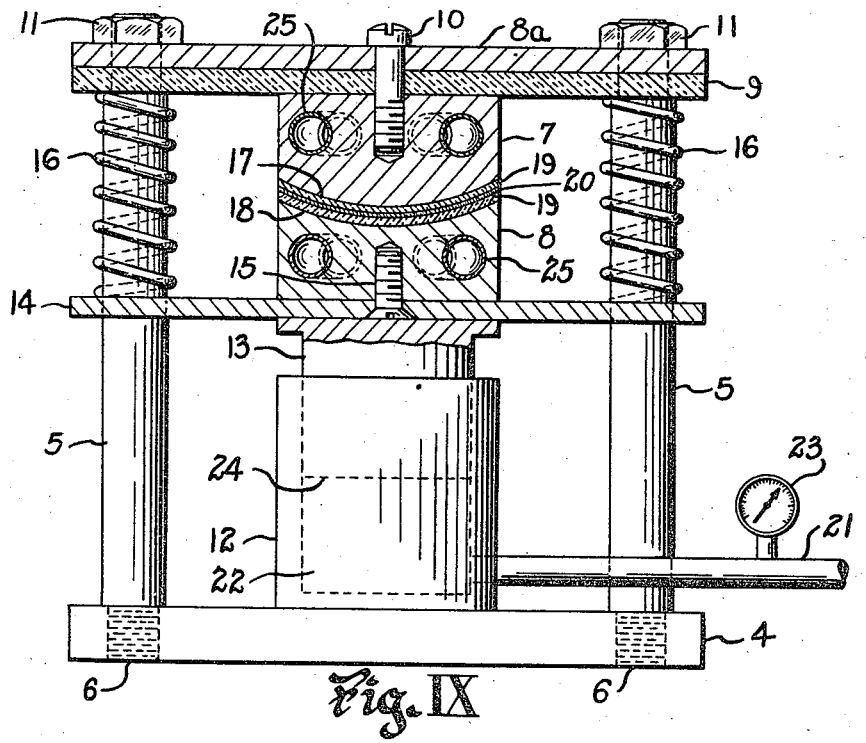
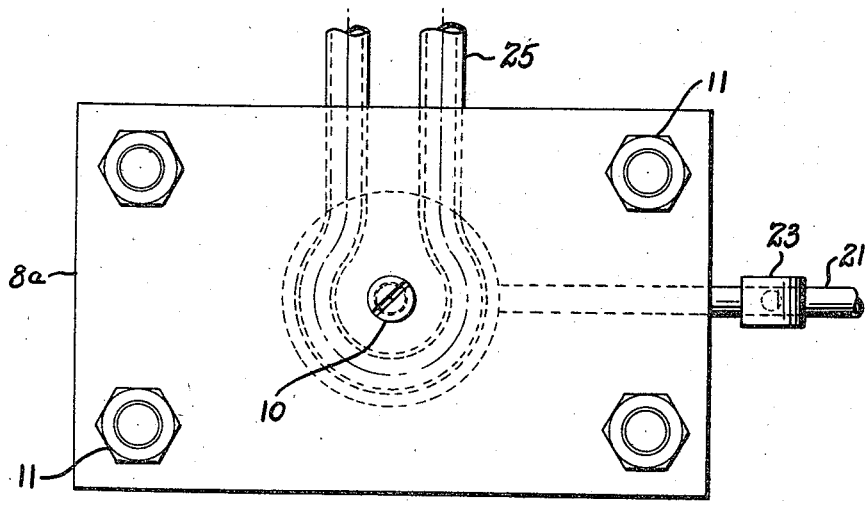
INVENTOR.
HAROLD R. MOULTON.
BY Harry H. Styll
ATTORNEY.

Patented Sept. 5, 1944

2,357,345

UNITED STATES PATENT OFFICE 2,357,345

LENS AND PROCESS FOR MAKING SAME

Harold R. Moulton, Southbridge, Mass., assignor to American Optical Company, Southbridge, Mass., a voluntary association of Massachusetts Application December 2, 1939, Serial No. 307,338

4 Claims. (Cl. 154—2.70)

This invention relates to improvements in laminated bodies and lenses and to an improved process of making the same.

This application is a continuation in part of my copending application Serial #162,729, filed Sept. 7, 1937.

A principal object of the invention is to provide a laminated body or lens having a non-frangible lamina that has improved holding characteristics and better optical refractive qualities than those hitherto produced.

Another object of the invention is to provide a laminated body or lens with a non-frangible lamina which is adapted to retain its holding strength throughout a wide range of temperature variation.

Another object of the invention is to provide a laminated body or lens with a non-frangible lamina in which one step of the process of assembly is the assembly of the lamina when wet with water.

Another object of the invention is to provide a method of assembling laminated bodies which includes the steps of cleansing the interfaces of said bodies with clear water, assembling said laminations while still wet, and applying a suitable heat and pressure to said laminations so as to join the interfaces thereof.

Another object of the invention is to provide a laminated body or lens with a non-frangible lamina and with means of retarding certain selected light rays.

Another object of the invention is to provide such a body or lens incorporating certain desired colors or color combinations.

Another object of the invention is to provide improved processes for securing the lamina together.

Another object of the invention is to provide simple, efficient and economical means and procedures for producing such bodies and lenses.

Other objects and advantages of the invention will become apparent from the accompanying drawings and description. It will be apparent that many changes may be made from the arrangement of parts, details of construction and steps of the processes within the scope of the accompanying claims. I therefore do not wish to be limited to the exact details shown and described as the preferred forms only have been shown by way of illustration.

Referring to the drawings:

Fig. I is a front view of a lens embodying the invention;

Fig. II is a cross section on either of the lines II—II of Fig. I;

Fig. III is a front view of another lens embodying the invention;

Fig. IV is a cross section on either of the lines IV—IV of Fig. III;

Fig. V is a front view of another lens embodying the invention;

Fig. VI is a cross section on either of the lines VI—VI of Fig. V;

Fig. VII is a front view of another lens embodying the invention;

Fig. VIII is a cross section on either of the lines VIII—VIII of Fig. VII;

Fig. IX is an elevation of a molding apparatus for use in forming a lens embodying this invention; and Fig. X is a plan view of the device of Fig. IX, showing the relative position of the upper-right posts and the heating element inlet.

In laminated bodies previously produced the non-frangible lamina has been made in some instances of cellulose composition, of acrylic esters or toluol sulfanamide-aldehyde resins or the like. There have been many disadvantages to lamina compositions particularly in the holding characteristics or strength of lamination and in the optical refractive properties of the finished lens. The optical refractive properties of some have been poor and the holding strength of all has been lower than that necessary to produce an efficient lamination, particularly with respect to temperature variation. It has been found that the laminations of the prior art composition have not had resistance to temperature variation. Upon the application of high or low temperatures the said lamina will shatter or break away from the lamination. Difficulty has been encountered due to infiltration around the edge of the lamination, that is the breaking away of the lamination along its edge portion due to insufficient holding strength or insufficient resistance to temperature variation. It was found in some cases necessary to seal the edges of these lenses with a binder which in some cases was similar to the make up of the lamina itself. This made an extra operation in the manufacture of this lens which in itself had difficulties in producing a completely and accurately sealed edge portion which would entirely prevent the infiltration of dirt or air or the breaking away of the lamination adjacent the edge. Difficulty has also been experienced with the bond between the layers throughout the areas thereof, which was weakened by infiltration or breaking away due to temperature variation and caused deterioration of the bodies or the lenses.

It is a principal object of this invention to overcome these defects and disadvantages by providing a laminated lens having a lamina of glass joined with a lamina of resinous material with a sufficient holding strength throughout its area to prevent infiltration and breaking away of the lamina and to resist the effect of temperature variation throughout its area so that the lamina will not shatter or break away at high or low temperatures to a greater degree than it does at normal temperature and which does not need edge sealing means to prevent infiltration or breaking away of the lamina and method of forming same.

Referring to the drawings in which similar reference characters denote corresponding parts throughout:

In Figs. I and II I have shown a flat or non-curved lens comprising a front layer 1 of glass, an intermediate non-frangible layer 2, and a rear layer of glass 3. The structure of Figs. III and IV are similar to the above except that the layers are bent or curved. In Figs. V and VI I have shown a flat or non-curved two-layer lens having the outer layer 1 and the non-frangible layer 2. The structure of the lens of Figs. VII and VIII is similar to that of Figs. V and VI, except that the layers are bent or curved.

The bodies and lenses of the invention may be flat or non-curved, curved, spheric, toric, cylindrical, aspherical or any desired curvature, or they may be prismatic.

The material of the glass layers 1 and 3 is preferably optical crown glass well known in the lens art, or of any glass desired having good optical transmission and having good optical refractive properties and the desired refractive index dispersion and capable of having surfaces having good optical refractive properties. The glass should be free of bubbles and striae and wavy surfaces. Practically all of the commercial glasses used for lenses in in the art are suitable.

Little if any difficulty has been experienced with the glass lamina in laminated bodies and lenses. The objection to them in the past has been directed to the non-frangible layers, their cohesion and their optical refractive properties having been poor. These non-frangible laminas have usually been cellulose derivatives.

Of late there has been a marked development in the improvement of non-frangible material suitable for lens use. These materials are of a transparent, vitreous, homogeneous plastic composition. The preferred material is a partial polyvinyl acetal whose analysis is expressed approximately as vinyl acetate 1.50, polyvinyl alcohol 20.00, and vinyl butyral 76.00. Several other compositions are Plexiglas, Lucite, metastyrol, and the like. The characteristics of the above materials are that they are not brittle, that they are optically isotropic, tough and non-frangible. The above materials are used to make the non-frangible layer 2.

When a binder of a partial polyvinyl acetal, plasticized with a liquid which may or may not be a solvent such as triglycol di-hexoate, ethylsebacate or the like is used, the finished lamina is resistant to the effect of temperature variation on the holding strength to a considerably greater degree than any of the prior art laminations. For instance, acetate and nitrate shatter at low temperature whereas the preferred form of applicant's invention remains shatter resistant at high or low temperatures. It is an essential of the process of applicant's invention to assemble the laminas when wet with water.

If desired the co-efficients of expansion of the laminas may be so controlled that when joined they will have a greater and more uniform holding strength throughout the interfaces thereof.

The plastic layer of the lamination is preferably of uniform thickness throughout and if desired an optical surface may be formed on said layer.

It is to be noted that in the laminated lens of applicant's invention any desired curvature may be formed on the outer surfaces of the lamina.

The glass layers of the lamination both are preferably of substantially the same thickness although in certain instances one may be formed thicker than the other if desired.

It is to be understood that if desired infra-red or ultra-violet absorbing ingredients may be incorporated in any or all of the laminas and the preferred form is to so incorporate these ingredients as to provide the greatest and most accurate transmission of the visible rays which is possible in their presence.

Applicant's invention preferably does not use any cement or adhesive between the laminas which would tend to reduce the efficiency of the visible light transmission or the holding strength.

The use of laminated bodies and lenses is widest in the field of protection lenses, that is, all use where the eye is subjected to possible injury from flying particles, blows, sudden temperature changes, heat, fumes, excessive light, etc., such as welders, chippers, industrial workers, war hazards and dangers of analogous kinds. The use of such lenses is very large and occupies an important place in the lens art.

Laminated bodies now have wide use also in windshields and windows for automobiles, airplanes, trains, homes and many similar uses.

These bodies and lenses may be made to possess many of the properties of other forms of bodies and lenses:

Either or both of the glass layers 1 and 3 may be tempered or hardened to make them resistant to blows and fracture by the usual prior art methods.

The outer surfaces of the glass layers 1 and 3, or the outer surface of the non-frangible layer 2 may be provided with optical prescriptive surfaces by prior art methods to provide for the optical correction of the wearer.

Any one or all of the layers may be colored as desired to produce a desired color effect or glare shield by using glass of the desired color, or by introducing the desired coloring into the non-frangible layer.

One of the most important features of such bodies and lenses is that they may be made to retard certain selected light rays either in the visible portion of the spectrum or beyond the visible, the most important of whch is the retarding of the ultra-violet rays and the infra-red rays.

The ultra-violet rays may be retarded by making one or both of the glass layers of a glass containing cerium, or ferric iron, examples of which are the commercial glasses known as Crookes glass and Cruxite glass, and other absorption glasses listed by the Bureau of Standards for retarding ultra-violet rays.

The non-frangible layer 2 may be made to possess ultra-violet retarding properties by introducing into its composition quinine compounds, cerium compounds, or other ultra-violet absorbing compounds compatible with the ingredients of the non-frangible layer.

In the glass layers both cerium and ferrous iron derivatives may be introduced to make the layer retardant both to ultra-violet rays and to infra-red rays. There is such a commercial glass known as Calobar.

The Bureau of Standards lists both ultra-violet and infra-red retarding glasses in its publications.

Infra-red rays may be retarded by glasses having ferrous iron in their composition, as in the aforementioned Calobar glass.

The infra-red rays may also be retarded by plating a glass surface with a metallic mirror, such as gold. This mirror will reflect the heat rays and transmit the visible rays. The mirror should be on an inner surface to prevent scratching, and is best applied by electroplating in a vacuum.

The various layers may be treated in combination to produce the ray retarding result desired, and any or all of the layers may be so treated.

The lenses may be made glare resisting by color treatment as has been noted above.

The dispersions of the layers may be regulated as desired to produce required results and to make an achromatic combination of the layers.

These lenses and bodies being made of multiple layers lend themselves very aptly to the various combinations required to produce the properties required in the lens or body.

I produce the bodies and lenses of my invention as follows:

The glass layers 1 and 3 are provided with surfaces of good optical refractive properties either by grinding and polishing in the usual prior art manner for lenses or by using a glass sheet stock having surfaces with good optical properties. This glass is provided with any of the properties desired as set forth above.

I provide the non-frangible layer 2 of a material I have specified hereinabove, which may have surfaces with good optical refractive properties and which can be obtained commercially. I heat the said non-frangible layer until the surfaces become sticky or plastic. In the case of lenses as shown in Figs. II and IV, I place the sticky non-frangible layer 2 between two glass layers 1 and 3 under pressure, and let the assembled parts remain under pressure until the non-frangible layer adheres to the glass layers and cools and sets in place.

The non-frangible layer 2 also may be heated to plasticity and extruded between the two spaced glass layers 1 and 3 and allowed to cool and harden in position.

The non-frangible layer 3 may also be applied by dissolving the non-frangible material in a solvent and then painted, sprayed, poured or dipped onto the glass surface and the other glass surface pressed in place on the other side after the solvent has evaporated. Contacting liquids may be used.

I may also take a piece of the non-frangible material which may have surfaces with good optical properties and treat the surfaces with a plasticizer such as dibutyl phthalate or the like, and then press the two glass layers in place against the plasticized layer and then allow to dry under pressure.

Similar procedures may be followed in producing the lenses of Figs. IV, VI and VIII.

I have found it is much more preferable to work on the surfaces of the non-frangible layer instead of coating the surfaces of the glass because of consequent separation and accumulation of dirt.

I have also found that while there was a destructive edge infiltration in laminated lenses wherein cellulose compounds were used for the non-frangible layer, there is no edge infiltration present with the material I use for the non-frangible layer and that the costly procedure of edge sealing is unnecessary.

Pressure may be applied in aligning the parts by providing a resting block to support the parts and aligning a pressure plunger therewith which will apply and hold the pressure for the required time.

Materials that may be used for the non-frangible layer are: Polymerized vinyl acetate, vinyl chloride, mixed polymer of vinyl acetate and vinyl chloride, partial polyvinyl acetal plasticized with non-solvent plasticizers, such as triglycol di-hexoate, ethyl sebacate and the like.

These may be plasticized with di-buxtoxy-ethyl-phthalate, etc.

Vinyl acetate polymer may be plasticized with triglycol, di-hexoate.

Polymerized methyl methacrylate may be plasticized with non-volatile plasticizing agents such as dibutyl phthalate, etc.

In general the non-frangible layer is to be preferably made of a polymerized product of an unsaturated alkyl compound and plasticized with a non-volatile compatible plasticizing agent such as dibutyl phthalate, etc.

One of the properties of the non-frangible layer of the materials I use is that they retain their formed or pressed or distorted position and do not return to their original form, as is the case with the non-frangible layers of prior art structures.

The non-frangible layer treated as I have specified will adhere strongly to the glass layer or layers.

If desired a layer of protective material may be placed around the edges of the lenses to act as an edge seal, but as stated above, I have found that this is not necessary.

A preferred process of lamination is substantially as follows:

Two transparent components are cleansed with clear water which may be about room temperature which facilitates the solution of the dusting powder which is water soluble. Borax, sodium-sulphate and the lime are used to prevent the binder from sticking and also to prevent the picking up of dirt and dust by the binder. The binder or non-frangible layer is scrubbed vigorously to remove the powder and facilitate its solution, then assembled wet between the still wet transparent components. This scrubbing is done with clear water which may be at about room temperature. With a minimum of delay the assembly is placed between heating platens and heat and pressure are applied in suitable amounts to render the plastic soft and adhesive so that the pressure which is applied will cause the plastic to adhere to the lens or glass layer. The application of heat also assists in removing the water from the wet joining surfaces. The application of pressure and heat combined serves to force water out so substantially no water remains in the finished assembly. This oozing out of the water takes place before and during the raising of the temperature. The heat and pressure is so controlled as to be sufficient to remove the water or other cleansing liquid from the interfaces and to render one of the interfaces of the layers to be joined sufficiently soft and adhesive and to cause it to strongly adhere to the interface of the other layer. The assembly may or may not be allowed to cool under pressure.

If desired, solvents may be used to aid in softening and joining the interfaces of the laminas and high boiling point solvents are preferable. Most low boiling point solvents would produce bubbles.

A method is to apply liquid, which may or may not be a solvent, to the cleansed surfaces of the resinous material. This liquid may be triglycol, di-hexoate, ethyl-sebacate or other high boiling point liquids. The liquids used may be solvents of high boiling points which act as so called solvent plasticizers or as cited above in the case of triglycol di-hexoate and ethyl-sebacate, which are especially useful with partial polyvinyl acetals with which they act as non-solvent plasticizers and facilitate the removal of air bubbles and aid in the adhesion of the lamina to the transparent outer components.

Heat is applied in all instances. Pre-heated laminations may be used, or a fluid plastic, but it is preferable to use laminations which have not been pre-heated and to use plastics in sheet form.

If a dry sheet of lamina is assembled to a dry lens great difficulty is encountered in avoiding bubbles and preventing dirt from being incorporated into the lamination. One of the major advantages of applicant's invention is the avoidance of bubbles and dirt between the laminas.

Prior art methods of lamination have been developed for flat laminations and the methods used are not capable of being directly applied to curved laminations. Applicant provides a laminated lens either in flat or curved form and a process or method which is applicable to either flat or curved lenses.

In Figs. IX and X is illustrated a molding device for use in producing the lens of this invention. This comprises a base 4 on which is supported upright post members 5 which are threadedly or otherwise suitably connected to said base 4 as at 6. These uprights 5 act as supporting members for one portion of the mold 7 through a top plate 8a, which is preferably made of metal and a hard asbestos board 9, with the metal plate 8a, the asbestos board 9 and one portion of the mold 7 being connected by means of a screw 10 or similar suitable connecting means. The plate 8a is assembled on the uprights 5 by portions of the uprights 5 passing through the plate 8a as well as the board 9, and the plate and board being secured to said uprights 5 by means of nuts 11 or similar suitable holding means. Supported on the base 4 is a cylindrical hydraulic member 12 in which is slidably supported a plunger 13 which in turn supports a plate 14 which is slidably assembled on the uprights 5 for vertical movement relative thereto and which again in turn supports the other part of the mold 8 and is connected thereto by a screw 15 or similar suitable holding means. Between the plate 14 and the board 9 or the plate 8a on each of the uprights 5 is a spring member 16 which is adapted to normally hold the mold portions 7 and 8 in separated relation with each other. Upon the placing between the mold faces 17 and 18 of layers of glass 19 and plastic 20 to be laminated, hydraulic pressure is applied through an inlet 21 into a chamber 22 within the cylindrical member 12. This pressure is indicated upon a registering device 23 and acts upon the lower portion 24 of the plunger 13 in an upward direction. It will be noted upon the application of the hydraulic pressure, the plunger 13 will be urged upwardly against the action of the springs 16 and the two mold portions 7 and 8 will be urged toward each other against the laminations 19 and 20 to aid in achieving the desired lamination.

Suitable heating elements 25 are embedded in the mold portions 7 and 8. It will be noted in this particular instance that these heating elements comprise tubing which is preferably copper but may readily be of some other suitable material, through which a heating liquid or gas may be passed and thereby accomplishing the heating of the mold portions to the temperature desired.

It is particularly pointed out that the laminations 19 and 20 may be removed from the mold portions 7 and 8 while hot and thereafter allowed to cool or may be allowed to remain in the mold portions 7 and 8 and chilled and cooled therein. This could be accomplished by running a cool liquid or the like through the tubing of the heating elements 25.

The faces 17 and 18 are preferably formed to curvatures which are contrageneric to the curvatures of the outer faces of the laminations 19 so as to exert a substantially uniform pressure throughout the area thereof during the lamination process. It is to be noted that the molds 7 and 8 may be detached from the supporting plates by loosening and removing the screws 10 or 15 as the case may be. Through this arrangement molds may be provided which have differently curved surfaces thereon according to the layers 19 which are to be laminated.

It will thus be seen that controlled pressure and heat may be applied to mold portions 7 and 8 for the purpose of laminating layers of plastic and glass material as shown in 19 and 20 in accordance with the process of this invention and so as to produce a lamination as brought out in this invention.

It is to be understood that the molding apparatus shown is merely one form which may be used and that many other constructions may readily be designed to accomplish the same result. Various means of applying heat and pressure may also be used such as live steam and straight mechanical pressure.

From the foregoing it will be seen that I have provided articles and processes capable of efficiently obtaining all the advantages and objects of the invention in simple and inexpensive ways.

Having described my invention, I claim:

1. The process of forming a laminated article composed of at least a layer of relatively rigid transparent material and a layer of transparent relatively soft bonding material having a relatively low softening point comprising cleansing with water the surfaces of said layers which are to be joined to remove foreign material therefrom and to simultaneously form a relatively continuous film of water on said surfaces, assembling said layers in superimposed relation with each other while said layers still have these continuous films of water thereon in such a manner as to insure that there is a continuous uninterrupted film of said water throughout the contiguous surfaces of said layers, and applying heat and pressure to said layers while in assembled relation of an amount sufficient to remove said water and to bring about an intimate bond between said layers.

2. The method of laminating a plurality of layers of transparent material with one of said layers initially having a protective powder thereon, comprising cleansing with a liquid the surfaces of said layers to be joined with each other, said liquid being a solvent for the protective powder on one of said layers but which liquid will have substantially no attack upon the immediate material of said powder protected layer and simultaneously forming a continuous film of said liquid on the surfaces of said layers to be joined, placing said layer surfaces with their respective liquid films in a superimposed relation with each other in such a manner that the said liquid is substantially continuous throughout the effective usable portions of said layers and applying heat and pressure to said assembled layers of an amount sufficient to remove the liquid and to bring about an intimate bond between the effective usable portions of said layers.

3. The method of laminating a plurality of layers of transparent material with one of said layers initially having a protective non-adhesive coating thereon, comprising cleansing with a liquid the surfaces of said layers to be joined with each other, said liquid being a solvent for the protective non-adhesive coating on one of said layers but which liquid will have substantially no attack upon the immediate material of said non-adhesive coated protected layer and simultaneously forming a continuous film of said liquid on the surfaces of said layers to be joined, placing said layer surfaces with their respective liquid films in a superimposed relation with each other in such a manner that the said liquid is substantially continuous throughout the effective usable portions of said layers and applying heat and pressure to said assembled layers of an amount sufficient to remove the liquid and to bring about an intimate bond between the effective usable portions of said layers.

4. The process of forming a laminated article composed of at least a layer of relatively rigid transparent material and a layer of transparent relatively soft bonding material having a relatively low softening point comprising, cleansing the surfaces with a liquid which will not attack the bonding material of said layers which are to be joined to remove foreign material therefrom, and to simultaneously form a relatively continuous film of said liquid on said surfaces, assembling said layers in superimposed relation with each other while said layers still have these continuous films of said liquid thereon in such a manner as to insure that there is a continuous uninterrupted film of said liquid throughout the effective usable areas of the surfaces of said layers, and applying heat and pressure to said layers while in assembled relation of an amount sufficient to remove said liquid and to bring about an intimate bond between said layers.

HAROLD R. MOULTON.